United States Patent Office 3,382,204
Patented May 7, 1968

3,382,204
FIRE-RETARDANT COMPOSITIONS
Edward V. Gouinlock, Jr., Buffalo, N.Y., assignor to Hooker Chemical Corporation, Niagara Falls, N.Y., a corporation of New York
No Drawing. Filed Dec. 23, 1965, Ser. No. 516,126
10 Claims. (Cl. 260—33.8)

ABSTRACT OF THE DISCLOSURE

Lead arsenate has been found to be an effective adjuvant for rendering fire-retardant polymeric combustible polymers containing a halogenated organic compound selected from the group consisting of perhalopentacyclodecane and compounds of the formula:

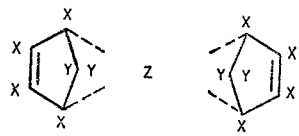

wherein X is selected from the group consisting of bromine, chlorine and fluorine, Y is selected from the group consisting of bromine, chlorine, fluorine, alkyl and alkoxy and Z is a tetravalent hydrocarbon radical having at least four carbon atoms wherein the valences are attached to two pairs of adjacent carbon atoms; and a lead arsenate.

---

This invention relates to novel fire-retardant polymeric compositions and to additive compositions for improving the fire-retardant properties of polymers.

It is known that the fire-retardant properties of various polymeric materials may be enhanced by the addition of various halogenated organic compounds which are derived from polyhalogenated cyclopentadiene. One such compound is perchloropentacyclodecane, ($C_{10}Cl_{12}$) a dimer of hexachlorocyclopentadiene. Other fire-retardant additives derived from polyhalogenated cyclopentadienes include compounds of the formula

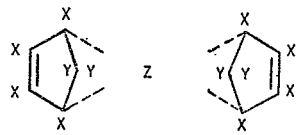

where X is a halogen and Y may be a halogen, alkyl or alkoxy, and is a tetravalent hydrocarbon radical. Commonly, the fire-retardant properties of such compositions are further enhanced by the addition of a compound of antimony such as antimony trioxide.

The aforementioned antimony trioxide is known to be an effective adjuvant for use with halogenated fire-retardant additives for polymeric compositions. However, in recent years, the availability of antimony trioxide has decreased substantially and the cost has risen considerably. This situation has stimulated a quest for an economical and effective substitute for antimony trioxide.

It has now been found that improved fire-retardant properties are imparted to polymeric materials by incorporating therein an additive composition comprising a halogenated organic compound selected from the group consisting of perhalopentacyclodecanes of the formula $C_{10}Cl_nMr_{12-n}$ where $n$ may be up to 12, and compounds of the formula

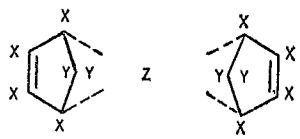

wherein X is selected from the group consisting of bromine, chlorine and fluorine, Y is selected from the group consisting of bromine, chlorine, fluorine, alkyl and alkoxy and Z is tetravalent hydrocarbon radical having at least 4 carbon atoms wherein the valence bonds are on two pairs of adjacent carbon atoms; and a lead-arsenate compound. The term lead-arsenate is intended to include the various arsenates of lead. The preferred lead arsenate compound is dibasic lead orthoarsenate, that is the compound characterized by the formula $PbHAsO_4$. Other suitable lead-arsenate compounds include lead orthoarsenate, i.e., $Pb_3(AsO_4)_2$; monobasic lead orthoarsenate, i.e., $Pb(H_2AsO_4)_2$; lead pyroarsenate, i.e., $Pb_2As_2O_7$; and lead metaarsenate, i.e., $Pb(AsO_3)_2$. In place of a portion or all of the lead arsenate there may be employed lead-arsenite or analogous suitable lead thioarsenate or lead thioarsenite compounds.

The aforementioned perhalopentacyclodecanes are box dimers of hexahalocyclopentadiene, characterized by the structural formula

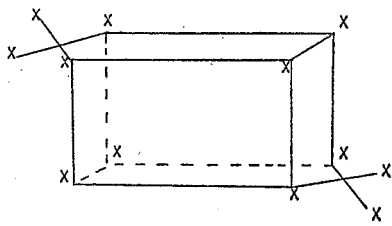

where X is chlorine or bromine. Perchloropentacyclodecane, $C_{10}Cl_{12}$ has a melting range of 483 to 487 degrees centigrade and may be prepared by the condensation of hexahalocyclopentadiene in the presence of aluminum chloride. Details of the preparation of the compound are disclosed in U.S. Patent No. 2,996,553. Other perhalopentacyclodecanes characterized by the formula $C_{10}Cl_nBr_{12-n}$ where $n$ is up to 11 may be prepared by contacting, mixing and reacting hexachlorocyclopentadiene and bromine in the presence of a catalytic amount of aluminum halide until the desired product result is formed. The reaction is described in detail in U.S. patent application S.N. 325,488, filed Nov. 23, 1963, now U.S. 3,313,857. Illustrative examples of such compounds are $C_{10}Cl_{11}Br$, $C_{10}Cl_{10}Br_2$, $C_{10}Cl_9Br_3$, $C_{10}Cl_8Br_4$ and the like. Preferred perhalopentacyclodecanes are those characterized by the formula $C_{10}Cl_nBr_{12-n}$ where $n$ is 8 to 12 and the most preferable is $C_{10}Cl_{12}$.

In the compounds of the formula

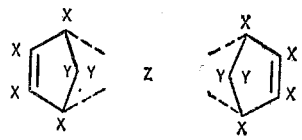

where X is bromine, chlorine or fluorine, Y is bromine, chlorine, fluorine, alkyl or alkoxy, and Z is a tetravalent hydrocarbon radical, when the Y constituent is an alkyl or alkoxy it may contain for example, from 1 to 10 carbon atoms and preferably from 1 to 6 carbon atoms. The Z constituent may be cyclic or acyclic and may contain substituents such as aryl from 6 to 14 carbon atoms, lower alkyl of 1 to 6 carbon atoms, bromine, chlorine or fluorine. When the Z constituent is acyclic the carbon chain may be from 4 to 50 carbon atoms and preferably from 4 to 20 carbon atoms. Typical of such compounds, wherein the Z constituent is acyclic, is the compound bis(1,2,3,4,7,7 hexachlorobyiclo[2.2.1]hept-2-ene - 5 - yl) butane. For convenience this compound will be referred to by its empirical formula $C_{18}H_{14}Cl_{12}$. A detailed description of the preparation of compounds of this type is disclosed in copending application S.N. 345,066, filed Feb. 17, 1964, now abandoned and continued as S.N. 597,853, filed Nov. 30, 1966, which is also now abandoned and continued as S.N. 684,972, filed Nov. 22, 1967.

When the Z constituent is cyclic structure may contain from 5 to 50 carbon atoms and may be of from 1 to 15 cyclic structure. Preferably the cyclic structures will contain from 5 to 18 carbon atoms and from 1 to 5 cyclic structures. When Z is a plurality of cyclic structures, the cyclic structures are fused, that is, they share carbon atoms. The Z constituent may further contain substituents such as aryl of from 6 to 14 carbon atoms, lower alkyl of 1 to 6 carbon atoms, bromine, chlorine or fluorine. A detailed description of the preparation of compounds of this type is disclosed in copending application S.N. 390,220, filed Aug. 17, 1964, now abandoned and continued as S.N. 625,594, filed Mar. 24, 1967.

Compounds of the formula

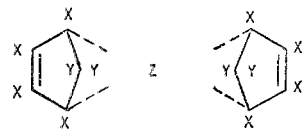

where X, Y and are as previously stated may be prepared by adducting (Diels-Alder reaction) one mole of a polyunsaturated aliphatic or cycloaliphatic compound and two or more moles of a polyhalogenated cyclopentadiene of the formula

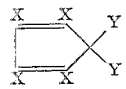

where X and Y are as previously stated. The polyunsaturated aliphatic compound mentioned above contains from 4 to at least about 18 carbon atoms and at least two sites of carbon to carbon unsaturation which may be either ethylenic or acetylenic.

The polyunsaturated cycloaliphatic compound mentioned above contains from 5 to about 50 carbon atoms, has 1 to 15 cyclic structures and when there are more than one cyclic structure, they are fused. It includes at least two sites of carbon unsaturation which may be either ethylenic or acetylenic.

Illustrative of the polyhalogenated cyclopentadienes suitable for preparation of the aforementioned compounds are hexachlorocyclopentadiene, 5,5-dimethoxytetrachlorocyclopentadiene, hexabromocyclopentadiene, 5,5-difluorotetrachlorocyclopentadiene, 5,5 - dibromo - tetrachlorocyclopentadiene and 5,5 diethoxytetrachlorocyclopentadiene.

Satisfactory polyunsaturated cycloaliphatic compounds for use in preparing the Diels-Alder adduct with the polyhalogenated cyclopentadiene include cycloaliphatic compounds exemplified by but not limited to methyl cyclopentadiene, cyclopentadiene, dicyclopentadiene, bicyclo (2.2.1)heptadiene, 1,5 - cyclooctadiene, cyclodecadiene, and cyclododecatriene.

Suitable polyunsaturated aliphatic compounds for use in preparing the above-described Diels-Alder adducts include aliphatic compounds exemplified by but not limited to 1,3-butadiene; 1,5-hexadiene; 1,7 - octadiene; 1,11-dodecadiene and dimethyl butadiene.

The preparation of 1,4,7,10 - dimethanocycloocta-1,2,3,4,7,8,9,10,13,13,14,14 - dodecachloro - 1,4,4a,5,6,-6a,7,10,10a,11,12,12a - dodecahydro[1,2,5,6]dibenzene is disclosed by Ziegler and Froitzheim-Kuhlhorn Annalen, 1959, 589, 157. The compound has the assigned structure:

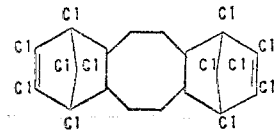

For convenience this compound will be referred to by the short title of 1,5-COD. It may be prepared by condensing two moles of hexachlorocyclopentadiene with one mole of 1,5-cyclooctadiene in xylene at a temperatrue below 200 degrees centigrade. It melts at above 350 degrees centigrade and has a vapor pressure of 0.006 millimeter of mercury at 197 degrees centigrade.

In a similar manner 1,2,3,4,6,7,8,9,13,13,14,14-dodecachloro - 1,4:5, 10:6,9 - trimethano-11H-benzo[b]fluorene may be prepared by condensing two moles of hexachlorocyclopentadiene with one mole of dicyclopentadiene. The adduct has the assigned structure:

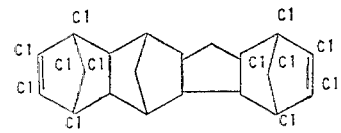

For convenience this compound will be referred to as DCP. DCP melts at about 277 degrees centigrade to 278 degrees centigrade and has a vapor pressure of 0.044 millimeter of mercury at 197 degrees centigrade.

Likewise 1,2,3,4,5,6,7,8,10,10,11,11 - dodecachloro-1,4:5,8-dimethanofluorene is prepared by condensing two moles of hexachlorocyclopentadiene with one mole of cyclopentadiene. This adduct has the assigned structure:

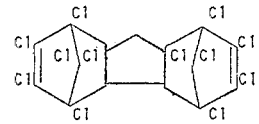

For convenience this adduct will be referred to as CP. CP melts at about 319 degrees centigrade to 322 degrees centigrade and has a vapor pressure of 0.031 millimeter of mercury at 197 degrees centigrade.

The adduct 1,2,3,4,5,6,7,8,12,12,13,13-dodecachloro-1,4:5,8:9,10 - trimethanoanthracene is prepared by condensing one mole of the Diels-Alder adducts of cyclopentadiene and acetylene with two moles of hexachlorocyclopentadiene. The resulting adduct has the assigned structure:

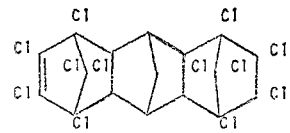

For convenenience this adduct will be referred to as BCH. BCH melts at about 340 degrees centigrade and has a vapor pressure of 0.008 millimeter of mercury at 197 degrees centigrade.

The preparation of the aforementioned compound $C_{18}H_{14}Cl_{12}$ is disclosed in copending application Ser. No. 345,066, filed Feb. 17, 1964, now abandoned and continued as Ser. No. 597,853, filed Nov. 30, 1966, which is also now abandoned and continued as Ser. No. 684,972, filed Nov. 22, 1967. It may be prepared by condensing 2 moles of hexachlorocyclopentadiene with 1 mole of 1,7-octadiene. The condensate is prepared at a temperature between 40 and 200 degrees centigrade and the excess hexachlorocyclopentadiene is removed by vacuum distillation. Thereafter the condensate is recrystallized from benzene to obtain a product that melts at 230 to 233 degrees centigrade.

The preparation of 2,2',3,3',4,4',5,5',7,7,7',7'-dodecachloro-1,1',2,2',5,5',6,6'-octahydro-2,2',5,5' - methanobiphenol is disclosed in United States Patent 2,606,910, issued Aug. 12, 1952. For convenience this compound will be referred to by its empirical formula $C_{14}H_6Cl_{12}$. The adduct is prepared by condensing two moles of hexachlorocyclopentadiene with 1 mole of 1,3-butadiene at a temperature below 200 degrees centigrade and thereafter recrystallizing the reaction product from isopropyl alcohol. The compound melts at about 232 degrees centigrade.

In a similar manner, various other compounds of the formula

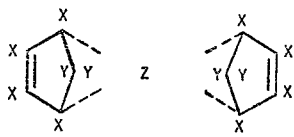

where X, Y and Z are as previously defined, which may be employed in the additive compositions of the present invention, may be prepared by a Diels-Alder adduction of a mole of a polyunsaturated aliphatic or cycloaliphatic compound and two or more moles of a polyhalogenated cyclopentadiene. The preferred compound is that prepared by adducting two moles of hexachlorocyclopentadiene, with one mole of 1,5-cyclooctadiene, that is, the compound described above and referred to as 1,5-COD.

A wide variety of combustible polymers may be rendered fire-retardant in accordance with the present invention. Such polymers include, for example, the homopolymers and copolymers of unsaturated aliphatic, unsaturated alicyclic and alkenyl aromatic hydrocarbons. Suitable monomers from which these may be made include ethylene, propylene, butene, pentene, hexene, heptene, octene, 2-methylpropene-1, 3-methylbutene-1, 4-methylpentene-1, 4-methylhexene-1, 5-methylhexene-1, bicyclo(2.2.1)-2-heptene, butadiene, pentadiene, hexadiene, isoprene, 2,3-dimethylbutadiene-1,3, 2-methylpentadiene-1,3-4-vinylcyclohexene, vinylcyclohexene, cyclopentadiene, styrene and methylstyrene, and the like. Preferred polymers include the polyolefins, such as polyethylene and polypropylene, and polystyrene.

Polystyrene and polyethylene have been long known in the art. Polystyrene is readily produced by mass, solution or emulsion polymerization as described in The Technology of Plastics and Resins, Mason, J. P., and Manning, J. F., Van Nostrand Company (1945). The polymerization is promoted by the action of light and catalysts such as hydrogen peroxide, benzoyl peroxide and other organic peroxides. Suitable solvents for solution polymerization are toluene, xylene and chlorobenzene. Typical commercial polystyrene is characterized by a density of between about 0.98 and 1.10 grams per cubic centimeter.

Polyethylene may be prepared from ethylene by various processes. Low-density (e.g., 0.91 to 0.93 gram per cubic centimeter) polyethylene may be produced by the polymerization of ethylene at a pressure greater than twelve hundred atmospheres and at a temperature of one hundred to three hundred degrees centigrade. Lower pressures of about five hundred atmospheres can be used if a catalyst such as oxygen or benzoyl peroxide is added to the ethylene as described by Fawcette et al., Chemical Abstracts, 32, 1362 (1938). High density polyethylene (e.g., 0.93–0.97 gram per cubic centimeter) having a molecular weight which may vary from about 10,000 to as high as about 3,000,000 may be prepared by the polymerization of ethylene in the presence of complex metal catalysts such as a combination of aluminum triethyl and a halide of titanium or a supported metal oxide catalyst. Similar catalyst systems may be employed to produce polypropylene and various other linear and stereospecific polymers of other α-olefins or conjugated diolefins. Typical commercial polypropylene is characterized by a density of between about 0.90 and 0.91 gram per cubic centimeter. The preparation of olefin polymers is discussed in detail in Polymerization of Olefins by Complex Metal Catalysts, by J. K. Stille, Chemical Reviews, vol. 58, No. 3, pp. 541–580 (1958).

Additional polymers which may be improved in accordance with the present invention include, for example, the polyesters, polyamides, polyureas, polyurethane, alkyds, polyethers, phenolics, urea resins, melamine resins, epoxides and polycarbonates. The polyesters are thermoplastic resins produced by the reaction of a dibasic acid and a dihydroxy compound. The unsaturated polyesters can be further polymerized by crosslinking with an unsaturated monomer, such as styrene. Alkyds are polyesters formed from a polybasic acid and a polyhydric alcohol modified with a fatty acid.

Polyamides are prepared from dibasic acids and diamines. The polyurea may be prepared from the reaction of a diisocyanate and a diamine. Polyurethanes may be prepared from a diisocyanate and a polyfunctional alcohol. Polyethers may be prepared by a ring opening polymerization of a cyclic ether or by direct condensation of aldehydes. Typical phenolics are prepared by condensation of phenol and an aldehyde, e.g., novalacs. Urea or melamine may be reacted with formaldehyde to produce resins which are susceptible to further crosslinking. Epoxy thermosetting resins based on the reaction of a bis-phenol and epichlorohydrin. Polycarbonates are thermoplastic polymers prepared, for example, by reaction of a bis-phenol such as bis-(4-hydroxyphenyl)-2,2-propene with phosgene. Preparation of the foregoing polymers is disclosed in detail in Preparative Methods of Polymer Chemistry by W. R. Sorenson and T. W. Campbell, Interscience Publishers, Inc. (1961).

In addition, normally non-flammable polymers such as polyvinyl chloride which may contain a flammable constituent, such as a plasticizer, e.g., dioctyl phthalate are considered herein as combustible polymers which may be improved in accordance with the present invention. Such polymer compositions containing combustible ingredients, such as plasticizers, are discussed in detail in Modern Plastics Encyclopedia issue for 1965, vol. 42, No. 1A, McGraw-Hill, Inc., pages 271–286, 352–379 and 394–397.

A preferred class of polymers which may be employed in the fire-retardant compositions of the present invention are the polyolefins and, in particular, those prepared from olefin monomers having 2 to 4 carbon atoms. Included in this preferred class of polymers are those prepared from monomers of ethylene, propylene and the butylenes.

The components comprising the additive compositions of the present invention can be introduced into the polymer individually or as a preformed mixture, by any of several methods. The additives may be introduced into the polymer while the latter is dissolved in a suitable solvent. This procedure is especially useful when it is desired to mix the additives during the polymer manufacturing process. The polymer may then be recovered from the solvent, with the additives intimately mixed therewith. Usually, the additives are mixed with the polymer in the molten state at temperatures that can range from the melting point to the decomposition temperature of the polymer, for example, from 70 to 600 degrees centigrade. Alternatively, the additives and polymer may be dry-blended in the finely divided state so that an intimate mixture is obtained upon subsequent molding or extrusion. Various amounts of the additives may be employed. For example, the amount of halogenated organic constituent may be between about 2 and 60 percent by weight and the amount of lead arsenate may be between 1 and 30 percent by weight based on the weight of the polymeric composition. Preferably, the compositions comprise, in parts by weight, between 50 and 80 parts of polymer, between 12 and 35 parts of halogenated organic constituent and between 5 and 25 parts of the lead arsenate. For convenience the additive composition may be employed as a preformed mixture containing, for example, between about 9 and 300 parts by weight of a lead arsenate compound per 100 parts of halogenated organic compound. Preferably such additive compositions will contain between about taken. The average self-extinguishing time for the rods prepared and tested as described above was 12 seconds.

Following the procedure of this example, when polybutene is substituted for polypropylene, comparable fire-retardant properties are obtained. Similarly, when the aforementioned DCP or CP is substituted for the 1,5-COD, similar improved fire retardance is obtained.

EXAMPLES 2–18

The procedure of Example 1 was repeated except that the composition was varied at indicated. In Examples 15, 17 and 18 the $PbHAsO_4$ employed was of 94% purity and was similar to that employed in Example 1 except that it contained a minor amount of an inert red dye. The fire-retardant characteristics of the various compositions tested are shown hereinbelow.

TABLE

| Example | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| Composition (Parts by weight): | | | | | | | | | | | | | | | | | |
| Polypropylene | 60 | 60 | 55 | 55 | 55 | 60 | 60 | | | | | | | 60 | 60 | 60 | 55 |
| Polyethylene [1] | | | | | | | | 55 | 60 | 60 | 60 | | | | | | |
| Polystyrene [2] | | | | | | | | | | | | 70 | 80 | | | | |
| 1,5-COD | 40 | 26.7 | 25 | 30 | | 25 | 30 | 30 | 26.7 | 25 | | 20 | 15 | 27 | 25 | 36.5 | |
| Perchloropentacyclodecane | | | | | 30 | | | | | | 25 | | | | | | 30 |
| $PbHAsO_4$ | | | | 20 | | 15 | 10 | 15 | 13.3 | 15 | 15 | 10 | 5 | 13 | 15 | 3.5 | 15 |
| $Pb_2As_2O_4$ | | | | | 15 | 15 | | | | | | | | | | | |
| $Sb_2O_3$ (for comparison) | | 13.3 | | | | | | | | | | | | | | | 4 |
| Average Self-Extinguishing Time (seconds) | 96 | 9 | 15 | 24 | 17 | 18 | 37 | 15 | 38 | 40 | 30 | 8 | 37 | 35 | 19 | 81 | 4 |

[1] Alathon® 5 B low density polythylene available from E. I. du Pont de Nemours & Co., Inc. Wilmington, Del., ground to pass 20 mesh, U.S. Standard Sieve Series.
[2] Lustrex® Hi flow-77 polystyrene, available from Monsanto Company, St. Louis, Mo., ground to pass 20 mesh, U.S. Standrad Sieve Series.

25 and 110 parts by weight of the lead arsenate compound per 100 parts of the halogenated organic compound.

By way of further illustrating the present invention and the manner in which it may be practiced, the following specific examples are set forth. Unless otherwise indicated all parts are by weight.

EXAMPLE 1

A mixture of 55 parts of polypropylene (Avisun 1014, a general purpose, injection molding grade polypropylene available from Avisun Corporation), ground to pass 50 mesh, U.S. standard sieve series; 30 parts of powdered 1,5-COD; and 15 parts of powdered $PbHAsO_4$ (particle size less than 1 micron) was dry blended for 30 minutes and melt blended for 10 minutes at 200 degrees centigrade. The blended composition was then molded at 200 degrees centigrade into rods 7 millimeters in diameter, and the rods were tested for fire retardance. The $PbHAsO_4$ employed was a commercial grade, 94% purity, identical with that produced for insecticidal use and available from FMC Corporation as Suspenso® Code 366 lead arsenate, except that it did not contain the minor amount of inert red dye normally present in such compositions.

Fire retardance of the rods was tested following a modified version of test procedure D635–56T of the American Society for Testing Materials. The procedure employed was as follows: The rod to be tested, which was 7 millimeters in diameter, was held in a horizontal position while a flame from a vertically disposed Bunsen burner, burning propane gas, was held for 30 seconds with the flame touching the end of the rod tangentially. On removal of the flame, after 30 second ignition time, the burning characteristics of the rod were observed and classified into one of the following three categories: (1) Burning, wherein the rod continued to burn on removal of the flame and the rod was completely consumed; (2) self-extinguishing, wherein the length of time which the specimen burned, after removal of the flame, was noted; and (3) non-burning, wherein the specimen was self-extinguishing immediately on removal of the flame.

The test was repeated five times with rods of the same composition, and an average of the results was taken.

Following the procedure of Examples 1–18, comparable fire retardant properties are obtained when other lead arsenates such as lead meta-arsenate, are employed or when other of the halogenated organic compounds herein disclosed, such as the aforementioned compound $C_{18}H_{14}Cl_{12}$, are employed. Similarly, when other combustible polymers such as phenolics or polyurethanes are substituted for polymers shown, similar improved fire retardance is obtained.

If desired, the polymeric compositions of the present invention may be employed in admixture with various modifiers and other additives well known in the art, such as plasticizers, stabilizers, lubricants, colorants, extenders, fillers and the like.

It will be apparent to those skilled in the art that many variations and modifications of the invention as hereinabove set forth may be made without departing from the spirit and scope of the invention. The invention is not to be construed as being limited to the examples given.

What is claimed is:

1. A fire-retardant polymeric composition comprising (1) a combustible polymer; (2) a halogenated organic compound selected from the group consisting of perhalopentacyclodecane and compounds of the formula:

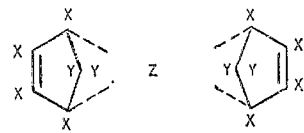

wherein X is selected from the group consisting of bromine, chlorine and fluorine, Y is selected from the group consisting of bromine, chlorine, fluorine, alkyl and alkoxy and Z is a tetravalent hydrocarbon radical having at least four carbon atoms wherein the valences are attached to two pairs of adjacent carbon atoms; and (3) a lead arsenate, the amount of said halogenated organic compound comprising between about 2 and about 60 percent by weight and the amount of lead arsenate comprising between about 1 and about 30 percent by weight of the polymeric composition.

2. A fire-retardant polymeric composition according to claim 1 wherein said halogenated organic compound is perchloropentacyclodecane.

3. A fire-retardant polymeric composition according to claim 2 wherein said lead arsenate is $PbHAsO_4$.

4. A fire-retardant polymeric composition according to claim 3 comprising in parts by weight, between about 50 and 80 parts of a polymer selected from the group consisting of polypropylene, polyethylene and polystyrene; between about 12 and 35 parts of said perchloropentacyclodecane; and between about 5 and 25 parts of said $PbHAsO_4$.

5. A fire-retardant polymeric composition according to claim 1 wherein said halogenated organic compound is characterized by the formula

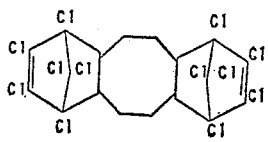

6. A fire-retardant polymeric composition according to claim 5 wherein said lead arsenate is $PbHAsO_4$.

7. A fire-retardant polymeric composition according to claim 6 comprising in parts by weight, between about 50 and 80 parts of a polymer selected from the group consisting of polypropylene, polyethylene and polystyrene; between about 5 and 25 parts of said $PbHAsO_4$ and between about 12 and 35 parts of said halogenated organic compound.

8. A fire-retardant additive composition comprising (1) a halogenated organic compound selected from the group consisting of perhalopentacyclodecane and compounds of the formula:

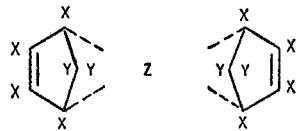

wherein X is selected from the group consisting of bromine, chlorine and fluorine, Y is selected from the group consisting of bromine, chlorine, fluorine, alkyl and alkoxy and Z is a tetravalent hydrocarbon radical having at least four carbon atoms wherein the valences are attached to two pairs of adjacent carbon atoms; and (2) a lead arsenate, the amount of said lead arsenate comprising between about 9 and about 300 parts by weight of lead arsenate compound per 100 parts of said halogenated organic compound.

9. A fire-retardant additive composition according to claim 8 wherein said halogenated organic compound is perchloropentacyclodecane and said lead arsenate is $PbHAsO_4$.

10. A fire-retardant additive composition according to claim 8 wherein said halogenated organic compound is characterized by the formula

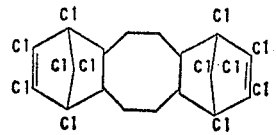

and said lead arsenate is $PbHAsO_4$.

No references cited.

MORRIS LIEBMAN, *Primary Examiner.*

S. L. FOX, *Assistant Examiner.*